US012076799B2

United States Patent
Flodman et al.

(10) Patent No.: US 12,076,799 B2
(45) Date of Patent: Sep. 3, 2024

(54) TOOL BODY AND A MILLING TOOL

(71) Applicant: SECO TOOLS AB, Fagersta (SE)

(72) Inventors: Rikard Flodman, Arboga (SE); Kent Karlsson, Fellingsbro (SE)

(73) Assignee: SECO TOOLS AB, Fagersta (SE)

( * ) Notice: Subject to any disclaimer, the term of this patent is extended or adjusted under 35 U.S.C. 154(b) by 96 days.

(21) Appl. No.: 17/050,680

(22) PCT Filed: Apr. 10, 2019

(86) PCT No.: PCT/EP2019/059013
§ 371 (c)(1),
(2) Date: Oct. 26, 2020

(87) PCT Pub. No.: WO2019/206626
PCT Pub. Date: Oct. 31, 2019

(65) Prior Publication Data
US 2021/0237176 A1 Aug. 5, 2021

(30) Foreign Application Priority Data
Apr. 27, 2018 (EP) .................................... 18169829

(51) Int. Cl.
*B23C 5/06* (2006.01)
(52) U.S. Cl.
CPC ............ *B23C 5/06* (2013.01); *B23C 2230/04* (2013.01)
(58) Field of Classification Search
CPC .. B23C 5/06; B23C 5/006; B23C 5/10; B23C 5/28; B23C 2210/40; B23C 2210/402;
(Continued)

(56) References Cited

U.S. PATENT DOCUMENTS 507,071 A * 10/1893 Huff ....................... B23D 73/00
407/29.1
2,089,619 A * 8/1937 Ripley .................. B23D 71/00
407/29.1
(Continued)

FOREIGN PATENT DOCUMENTS

CN 1913997 A 2/2007
CN 102350536 B 10/2013
(Continued)

OTHER PUBLICATIONS

Definition of "concave" and "concavity"; Roget's II The New Thesaurus, 1995, Houghton Mifflin Company, Third Edition, p. 187. (Year: 1995).*

*Primary Examiner* — Nicole N Ramos
(74) *Attorney, Agent, or Firm* — Morgan, Lewis & Bockius LLP

(57) ABSTRACT

A tool body for a milling tool includes a front end and a rear end between which a center axis and a peripheral envelope surface extend. The tool body is arranged to be rotated in a direction of rotation around the center axis. At least one insert seat is configured to support a cutting insert. A chip pocket is provided in front of the insert seat in the direction of rotation, delimited by a wall surface. A surface pattern including a plurality of first grooves and second grooves is formed on at least a portion of the wall surface. The second grooves intersect the first grooves and each groove of the first grooves and/or each groove of the second grooves has a concave groove profile.

21 Claims, 4 Drawing Sheets

(58) Field of Classification Search
CPC ............ B23C 2230/04; B23C 2250/12; B23C 2260/80; B23B 51/06
See application file for complete search history.

(56) References Cited

U.S. PATENT DOCUMENTS

| | | | | |
|---|---|---|---|---|
| 3,345,738 | A * | 10/1967 | Mizikar | B21B 1/227 |
| | | | | 164/429 |
| 3,715,788 | A * | 2/1973 | Ayer | B23C 5/2468 |
| | | | | 407/42 |
| 5,160,232 | A * | 11/1992 | Maier | B23B 51/02 |
| | | | | 407/54 |
| 5,197,830 | A * | 3/1993 | Emoto | B23C 5/006 |
| | | | | 407/42 |
| 5,205,145 | A * | 4/1993 | Ishino | G01L 3/102 |
| | | | | 29/90.7 |
| 5,312,209 | A * | 5/1994 | Lindblom | B23B 51/02 |
| | | | | 408/230 |
| 5,873,683 | A * | 2/1999 | Krenzer | B23B 51/00 |
| | | | | 408/230 |
| 5,984,005 | A | 11/1999 | Hart et al. | |
| 6,739,808 | B1 | 5/2004 | Ghosh | |
| 7,546,786 | B2 * | 6/2009 | Waggle | B23C 5/006 |
| | | | | 407/115 |
| 8,122,937 | B2 * | 2/2012 | Eastman | B22D 11/0651 |
| | | | | 164/428 |
| 9,849,523 | B2 * | 12/2017 | Jiang | B23C 5/2226 |
| 2001/0029770 | A1 * | 10/2001 | Hoopman | B24D 11/008 |
| | | | | 407/120 |
| 2002/0184988 | A1 * | 12/2002 | Rohman | B23D 61/123 |
| | | | | 83/13 |
| 2006/0088390 | A1 | 4/2006 | Wallstrom et al. | |
| 2007/0231088 | A1 | 10/2007 | Waggle et al. | |
| 2007/0274791 | A1 * | 11/2007 | Pantzar | B23C 5/22 |
| | | | | 76/115 |
| 2015/0231703 | A1 * | 8/2015 | Bjormander | C23C 16/0263 |
| | | | | 407/115 |
| 2017/0361384 | A1 * | 12/2017 | Boulakhov | B23C 5/10 |

FOREIGN PATENT DOCUMENTS

| | | | |
|---|---|---|---|
| CN | 104374204 A * | 2/2015 | |
| DE | 10053343 A1 | 5/2002 | |
| EP | 1654085 A1 | 5/2006 | |
| JP | H0691416 A | 4/1994 | |
| JP | 2010184307 A | 8/2010 | |
| JP | 2015-007295 A | 1/2016 | |
| WO | WO-2005016583 A1 * | 2/2005 | ............ B23C 5/006 |
| WO | 2016045928 A1 | 3/2016 | |

* cited by examiner

TOOL BODY AND A MILLING TOOL

RELATED APPLICATION DATA

This application is a § 371 National Stage Application of PCT International Application No. PCT/EP2019/059013 filed Apr. 10, 2019 claiming priority to EP 18169829.1 filed Apr. 27, 2018.

TECHNICAL FIELD OF THE INVENTION

The present invention relates to a tool body for a milling tool according to the preamble of claim 1 and a milling tool comprising such a tool body. The invention also relates to a method for manufacturing a tool body for a milling tool.

BACKGROUND OF THE INVENTION AND PRIOR ART

For certain milling applications and workpiece materials, there is a risk that chips get obstructed during evacuation via the chip pocket. This may result in chip jamming, which may in turn cause problems such as milling tool breakage and a deteriorated quality of the machined surface. A chip pocket for evacuation of chips, which is provided ahead of the cutting edge of the milling tool, should therefore be designed to minimise the risk of chip jamming.

EP1654085 discloses a milling tool comprising a tool body and a plurality of cutting inserts mounted therein. In front of each cutting insert, a chip pocket is provided for evacuation of chips formed during machining. In a wall surface delimiting the chip pocket, a plurality of smooth grooves are formed, separated by continuous ridges extending along the grooves. However, there is a risk that chips will rub continuously against the ridges, thereby slowing down the chip flow.

SUMMARY OF THE INVENTION

It is desirable to provide an in at least some aspect improved tool body for a milling tool. In particular, it would be desirable to provide such a tool body that contributes to a reduced friction in the chip evacuation process during machining. It would also be desirable to provide an in at least some aspect improved method of manufacturing a tool body for a milling tool.

To better address these concerns, the initially defined tool body for a milling tool is provided. The tool body comprises:
- a front end and a rear end between which a centre axis and a peripheral envelope surface extend, the tool body being configured to be rotated in a direction of rotation around the centre axis,
- at least one insert seat formed in a transition between the front end and the peripheral envelope surface, wherein the insert seat is configured to support a cutting insert adapted to be mounted therein,
- a chip pocket provided in front of the insert seat in the direction of rotation, wherein the chip pocket is delimited by a wall surface.

The tool body is characterised in that a surface pattern comprising a plurality of first grooves and second grooves is formed on at least a portion of the wall surface, wherein the second grooves intersect the first grooves, and wherein each groove of the first grooves and/or each groove of the second grooves has a concave groove profile.

According to another aspect, the invention relates to a method for manufacturing the proposed tool body. The method comprises:
- providing a tool body blank,
- removing material from the tool body blank by a first tool to create a space forming the chip pocket,
- machining the insert seat,
- creating the first grooves in the wall surface with a first ball-nose milling cutter,
- creating the second grooves in the wall surface with a second ball-nose milling cutter, such that the second grooves intersect the first grooves to create a surface pattern, the second ball-nose milling cutter being preferably the same milling cutter as the first ball-nose milling cutter,
- optionally, polishing and/or applying any other final treatment for deburring and/or rounding off sharp scallops between the grooves.

Thanks to the grooves, a reduced contact area is achieved between a chip being evacuated via the chip pocket during milling and the front wall surface of the chip pocket. The friction, and consequently also the risk of chip jamming, are thereby reduced and the chip flows smoothly over the surface pattern. Since the first and second grooves intersect, the risk that chips will rub against protrusions/ridges between the grooves is reduced in comparison with a surface pattern having non-intersecting grooves separated by continuous ridges. Furthermore, since the first and second grooves intersect, during wet machining when coolant/lubricant is applied to the tool and the cutting area via an external arrangement or via internal coolant channels arranged in the tool body, the distribution of coolant/lubricant over the wall surface is improved, such that the chips flow smoothly over the surface pattern.

The tool body may be provided with internal coolant channel or channels having an outlet in the wall surface and/or in a surface associated with the insert seat and/or in the front end of the tool body. Even though the outlet or the coolant channel is arranged in the front end of the tool body, or is arranged such that a coolant jet is directed toward a cutting insert mounted in the insert seat, and even though the coolant/lubricant is applied via an external arrangement, the coolant/lubricant will splash the wall surface of the chip pocket such that the described effect is achieved. Preferably, the outlet of the coolant channel is arranged in a part of the wall surface with the surface pattern.

The grooves may be formed using a ball-nose milling tool, creating a concave groove profile and scallops between neighbouring grooves. The grooves may also be formed with a transition surface between two neighbouring first grooves and/or between two neighbouring second grooves. When the grooves have been formed, the front wall surface of the chip pocket may be polished to round off the sharp scallops and/or sharp edges and/or remove burrs that may be present and/or achieve a smooth surface finish. Polishing is not the only method that can be used. Other methods such as blasting, shot peening or any other method to round off the sharp scallops can be used. A deburring process such as thermal deburring can also be used. Combinations of these methods may also be used to round off the sharp scallops and/or remove burrs and/or create desirable properties of the wall surface and/or the wall surface material. It is also possible to apply a coating to the wall surface, preferably a wear resistant coating.

By means of a concave groove profile is herein intended that, as seen in a sectional view, wherein a section is taken in a plane orthogonal to a length extension of the groove, a surface of the groove has a concave shape. A shape of the concave groove profile may preferably but not necessarily be identical or essentially identical (i.e. within manufacturing tolerances) for all of the first grooves and/or for all of the second grooves, respectively. Preferably, all grooves including the first grooves and the second grooves have an identical or essentially identical shape of the concave groove profile.

Thanks to the surface pattern, machining of the chip pocket can be done in a more cost efficient way. In conventional tool bodies, i.e. tool bodies having an even wall surface or a surface pattern having non-intersecting grooves separated by continuous ridges, the wall surface must have certain surface properties to avoid the risk of chip jamming. These surface requirements negatively influence the machining economy and the prise of the final milling tool. For example, in order to achieve a required surface finish of the wall surface, the cutting data must be kept low and a final expensive finishing operation must be included. At the same time, the wear of the tool used for machining of the chip pocket must be supervised and kept low which leads to a high tool change frequency. However, thanks to the surface pattern of the proposed tool body, the machining time can be decreased, both during the first manufacturing step when the space of the chip pocket is created, but also during the finishing operations, i.e. during the machining of the grooves. This is because a front end of a ball-nose milling tool is used to create the grooves, which allows high cutting data as the chips created by the ball-nose milling tool are thin, and the direction of the forces acting on the ball-nose milling tool is favourable.

According to one embodiment, for each first groove and/or each second groove, as seen in a sectional view orthogonal to a length extension of the groove, the concave groove profile extends between a first end point and a second end point, wherein a first tangent to the concave groove profile at the first end point and a second tangent to the concave groove profile at the second end point intersect below the concave groove profile, wherein an angle $\delta$ formed by the first tangent and the second tangent is such that $90° \leq \delta \leq 175°$, preferably $110° \leq \delta \leq 170°$. Within the angular interval, and in particular if the concave groove profile has the shape of a circular arc or an elliptical arc, the groove is relatively shallow and wide. This means that the risk of chips getting obstructed within the grooves is minimised.

According to one embodiment, the first grooves are arranged such that two neighbouring first grooves are immediately adjacent to each other. As seen in a sectional view orthogonal to the length extension of the first grooves, each two neighbouring first grooves may e.g. be connected by a convexly rounded portion with a relatively small radius of curvature in comparison with a radius of curvature of the concave groove profile, such as a scallop that has been formed during milling using a ball-nose milling tool and subsequently polished. The immediately adjacent grooves result in reduced friction during chip evacuation. The second grooves may also be immediately adjacent to each other, or alternatively they may be separated by a distance such that a ridge is formed, extending along the first grooves.

According to one embodiment, the concave groove profile is arc shaped. The arc may preferably be a circular arc, which is easily created using a ball-nose milling tool. The concave profile may also have the shape of an elliptic arc, or it may have the shape of a parabola, or a part of a parabola, or similar. Such a profile can be approximated by a circular arc where the profile of the approximation has an unchanged value of the angle $\delta$. A ball-nose milling tool may have a front that can create a profile of an elliptic arc or a shape of a parabola or similar and such profiles may also be created and can be used.

According to one embodiment, a radius of curvature or an approximated radius of curvature of the arc shaped concave groove profile is within the range of 1-6 mm.

According to one embodiment, a radius of curvature or an approximated radius of curvature of the concave groove profile of the first grooves is equal to a radius of curvature or an approximated radius of curvature of the concave groove profile of the second grooves (within manufacturing tolerances). This is preferable since the first and second grooves may hereby be formed using the same ball nose milling tool.

According to one embodiment, the wall surface comprises a front wall surface facing the insert seat, wherein the surface pattern covers at least a part of the front wall surface, preferably a major part of the front wall surface, more preferably the entire front wall surface, more preferably a major part of the wall surface, and even more preferably the entire wall surface.

According to one embodiment, the surface pattern comprises a plurality of protrusions formed between the first and second grooves, each protrusion being delimited by two neighbouring first grooves and two neighbouring second grooves. The protrusions are here to be understood as protruding with respect to a bottom level of the grooves. When the surface pattern is formed using a ball nose milling tool, the protrusions may be in the form of scallops created when milling the grooves. Preferably, the surface has been polished to round off the sharp scallops and/or the sharp edges. Preferably, all surfaces of each protrusion form part of the first grooves and second grooves that afterwards are or may be polished. If the grooves are relatively close to each other, such as immediately adjacent, each protrusion will have a base in the form of a parallelogram and four rounded side surfaces converging to a pointed (rounded) top of the protrusion. The side surfaces form part the first and second grooves. If the grooves are not relatively close to each other, instead of a pointed top the protrusion may have a top plateau delimited by four rounded side surfaces converging to the top plateau. In such a case the top plateau is in the form of a parallelogram having its largest side of no more than 3 mm. The pointed tops and/or edges and/or side surfaces and/or plateaus of the protrusions may be polished to round them off. As mentioned above, other post treatments may also be used. The form and shape of the protrusions may vary across the wall surface of the chip pocket.

According to one embodiment, each protrusion forms a ridge extending along the first grooves. In this case, a distance between the second grooves may be larger than a distance between the first grooves and/or the second grooves may be more shallow than the first grooves. The length of the ridge is determined by the distance between the second grooves and the depth and curvature of the second grooves. With a preferred distance between the second grooves of no more than 3 mm, the length of the ridge is at least less than 3 mm.

According to one embodiment, each protrusion, as seen in a sectional view orthogonal to a length extension of the first or the second grooves, has a rounded top. This may e.g. be achieved by polishing or any other post treatment as earlier explained. The rounded top reduces the friction during chip evacuation.

According to one embodiment, the first grooves are spaced by a first distance $d_1$ of 0.5-3 mm and/or the second grooves are spaced by a second distance $d_2$ of 0.5-3 mm. The first distance may be equal to the second distance, but it may also differ from the first distance. The first distance may be the same within the set of the first grooves, so that the first grooves are equispaced.

However, since the wall surface on which the grooves are formed is often curved, it is likely that the first distance differs by a small amount within the set of first grooves, and correspondingly within the set of second grooves.

According to one embodiment, the first grooves are parallel to each other and/or the second grooves are parallel to each other on at least a portion of the front wall surface. Preferably, at least neighbouring first grooves and/or neighbouring second grooves are parallel or essentially parallel to each other.

According to one embodiment, on a planar or essentially planar wall surface portion, the second grooves extend at an angle α with respect to the first grooves, wherein the angle α is within the range of 30-90°, preferably 60-90°.

According to one embodiment, a maximum depth of the first grooves and/or the second grooves is within the range of 0.03-0.20 mm, preferably 0.05-0.15 mm. Preferably, a ratio between the depth and the distance between the grooves is within the range 0.020-0.20, both for the first grooves and the second grooves.

The invention also relates to a milling tool comprising the proposed tool body and at least one cutting insert mounted in the at least one insert seat. Advantages and advantageous features of such a milling tool appear from the above description of the tool body.

Further advantageous features and advantages of the invention will appear from the following detailed description.

BRIEF DESCRIPTION OF THE DRAWINGS

Embodiments of the invention will in the following be described by means of example with reference to the appended drawings, in which.

DETAILED DESCRIPTION OF EMBODIMENTS OF THE INVENTION

Figure 1:
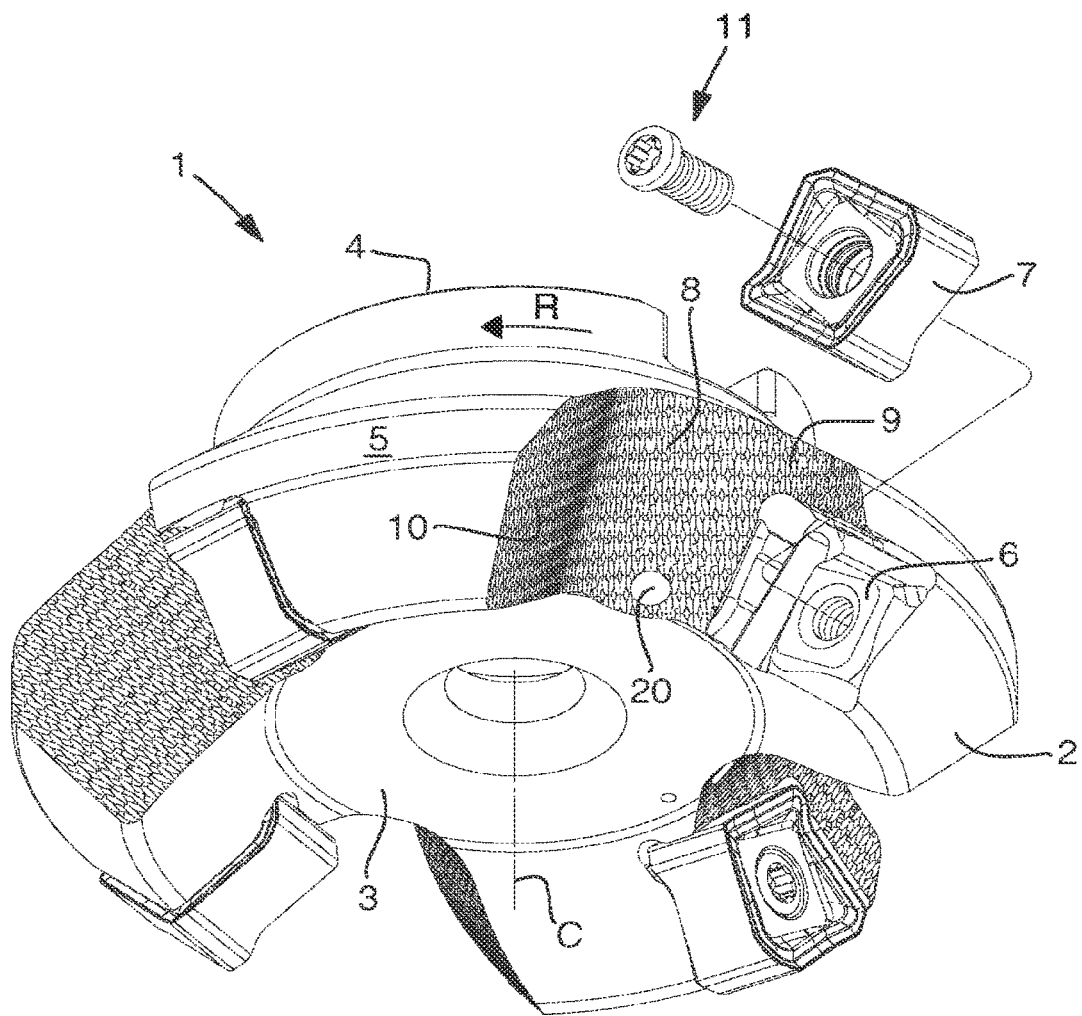
FIG. 1 is a perspective view schematically showing a milling tool according to an embodiment of the invention.
Figure 2:
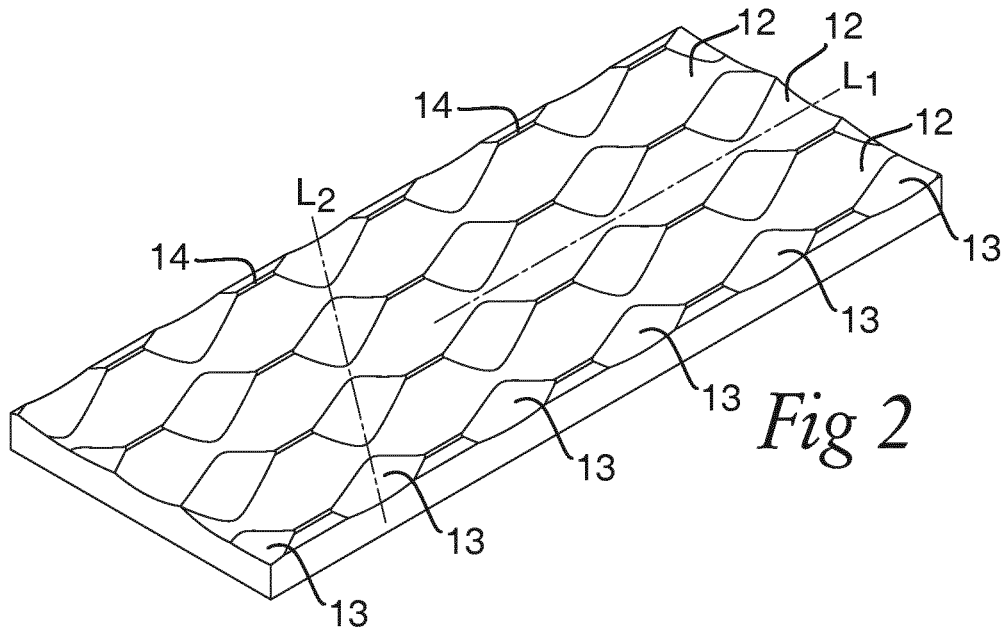
FIG. 2 is a perspective view schematically showing a part of a surface pattern of a tool body according to an embodiment of the invention.
Figure 6:
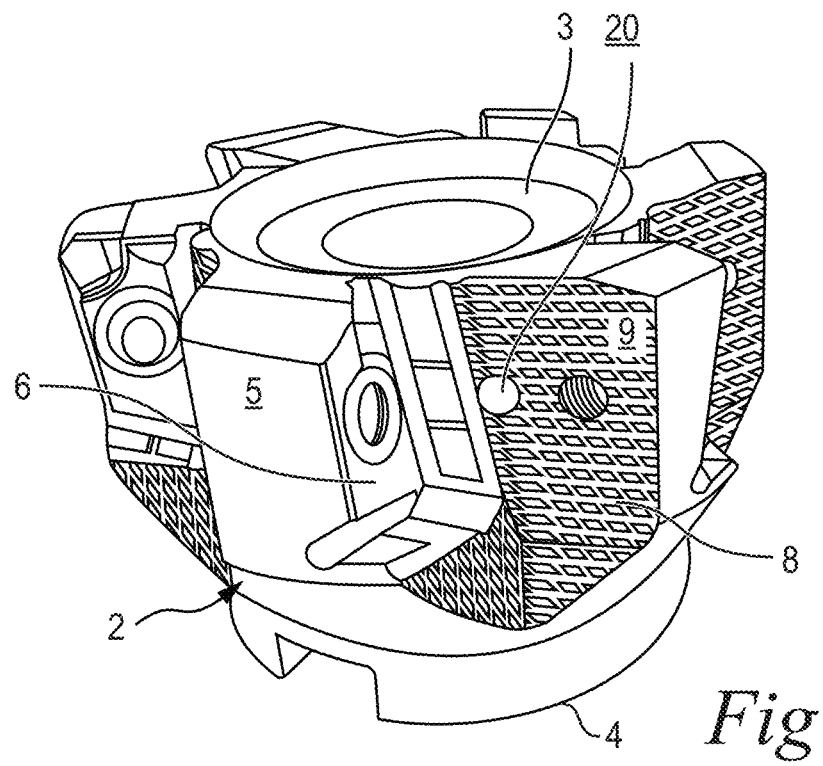
FIG. 6 is a photography showing a tool body according to another embodiment of the invention.

A milling tool 1 comprising a tool body 2 according to an embodiment of the invention is schematically shown in FIG. 1 and a tool body 2 according to another embodiment is shown in FIG. 6. In both embodiments, the tool body 2 comprises a front end 3 and a rear end 4 between which a centre axis C and a peripheral envelope surface 5 extend. The tool body 2 is configured to be rotated in a direction of rotation R around the centre axis C.

A plurality of insert seats 6 are formed in a transition between the front end 3 and the peripheral envelope surface 5. Each insert seat 6 is configured to support a cutting insert 7 adapted to be mounted therein. A chip pocket 8 is provided in front of each insert seat 6 in the direction of rotation R, wherein the chip pocket 8 is delimited by a wall surface 9, including a front wall surface 10 facing the insert seat 6 in the direction of rotation R. The cutting insert 7 is adapted to be fastened in the insert seat 6 using a fastening member 11, here in the form of a screw. When seen along the centre axis C and toward the front end 3, the chip pocket 8 of the milling tool 1 in FIG. 1 is substantially U-shaped. However, the chip pocket may be much more open and have other shapes.

The wall surface 9 is curved and covered by a surface pattern, preferably formed by ball nose milling followed by polishing. The surface pattern is shown in greater detail in FIGS. 2-5, in which the surface pattern is shown on a flat surface.

The surface pattern is formed by a plurality of first grooves 12, 12a-e, extending in parallel on at least a portion of the front wall surface 10, or essentially in parallel since the wall surface 9 is curved, with a first length extension $L_1$, and a plurality of second grooves 13, 13a-e extending in parallel or essentially in parallel with a second length extension $L_2$ on at least a portion of the front wall surface 10. For example, each two neighbouring first grooves 12, e.g. the grooves 12a, 12b, or second grooves 13, e.g. the groves 13a, 13b, may extend essentially in parallel, while first grooves 12 located on opposite ends of the wall surface 9 may have non-parallel extensions due to the curved wall surface 9. The second grooves 13 intersect the first grooves 12 and extend at an angle α with respect to the first grooves 12. In the shown embodiment, α=37°. Each groove of the first grooves 12 and of the second grooves 13 has a concave groove profile 17. In other words, in a sectional view orthogonal to the first length extension $L_1$ of one of the first grooves 12, a surface of the first groove 12 may be described as a concave curve. In the shown embodiment, the first and second grooves 12, 13 have identically shaped concave groove profiles 17, wherein the concave groove profile 17 may be described by a circular arc with a radius of curvature $R_1$ (first groove 12)=$R_2$ (second groove 13)=1.5 mm.

Figure 3:
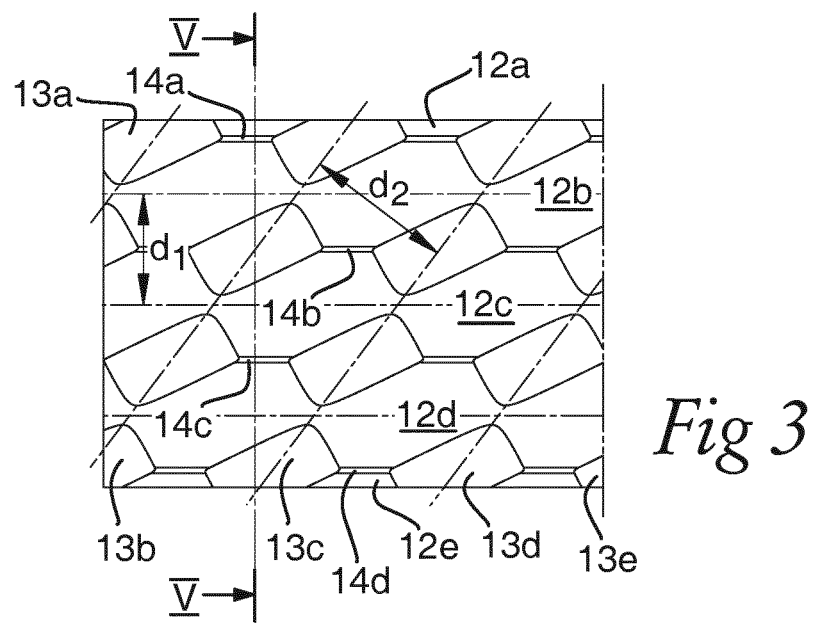
FIG. 3 is a top view showing the surface pattern in FIG. 2.
Figure 4:
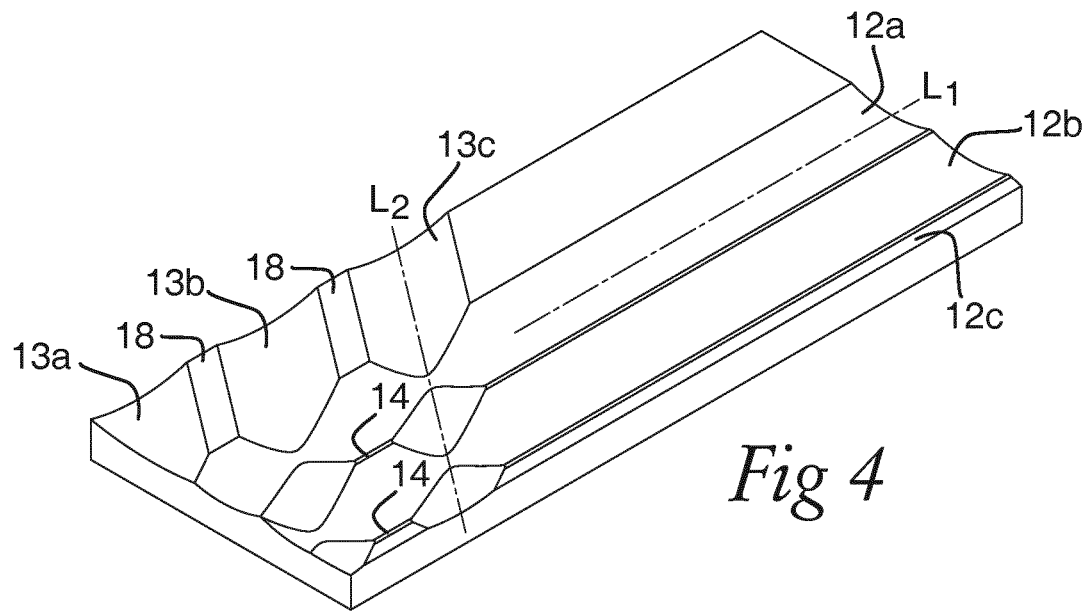
FIG. 4 is a perspective view showing a partially created surface pattern as in FIG. 2.

The first grooves 12 are arranged so that two neighbouring first grooves 12a, 12b are immediately adjacent to each other. This can be clearly seen in FIG. 4, showing a surface pattern which is only partly created, including three first grooves 12a, 12b, 12c and three intersecting second grooves 13a, 13b, 13c. While the neighbouring first grooves 12a, 12b are immediately adjacent, neighbouring second grooves 13b, 13c are separated by a ridge 18 having a flat top surface, extending along the second grooves 13b, 13c. The first grooves 12 are equispaced by a first distance $d_1$=1.1 mm (see FIG. 3) and have a depth $h_1$=0.11 mm (see FIG. 5). The second grooves 13 are equispaced by a second distance $d_2$=1.8 mm (see FIG. 3) and have a depth $h_2$=0.10 mm (not shown), i.e. slightly smaller than the first grooves 12. The depths $h_1$ and $h_2$ may vary within the surface pattern.

Delimited by two neighbouring first grooves 12 and two neighbouring second grooves 13, protrusions 14, 14a-c are formed. For example, as shown in FIG. 3, the protrusion 14b is delimited by the first grooves 12b, 12c and the second grooves 13b, 13c. As seen in a sectional view orthogonal to the first length extension $L_1$ of one of the first grooves 12 (see FIG. 5), each protrusion 14 is convexly rounded with a relatively small radius of curvature, in the shown embodiment 0.08 mm, in comparison with the radius of curvature $R_1$ of 1.5 mm of the concave groove profile. Each protrusion 14 forms a ridge having a flat top surface and extending in the first length direction $L_1$. The ridge is broken on each side by the second grooves 13 and has in the shown embodiment a length in the first length direction $L_1$ of approximately 0.5 mm.

The milling tool 1 is provided with a system of internal coolant channels. At least one coolant channel has at least one outlet 20 in the chip pocket 8. The system of internal coolant channels can be of any known kind.

Figure 5:
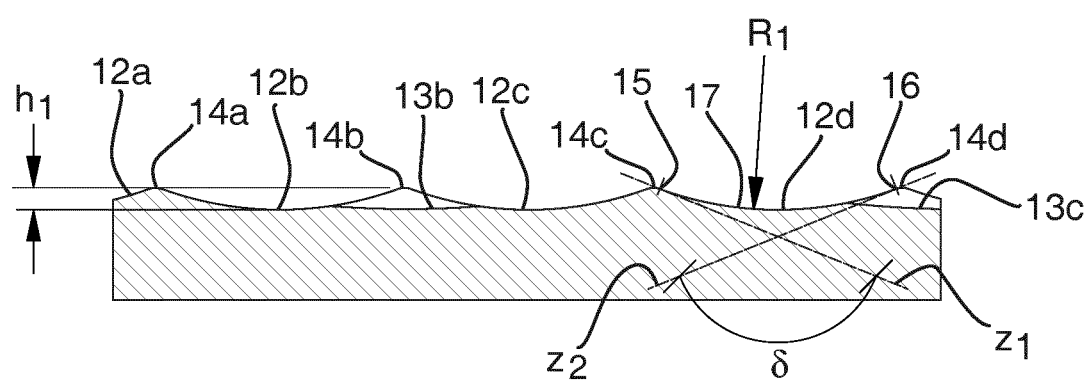
FIG. 5 is a sectional view along the line V-V in FIG. 3.

As seen in the sectional view in FIG. 5, orthogonal to the length extension $L_1$ of one of the first grooves 12d, the concave groove profile 17 extends between a first end point 15 and a second end point 16. A first tangent $z_1$ to the concave groove profile at the first end point 15 and a second tangent $z_2$ to the concave groove profile at the second end point 16 intersect below the concave groove profile 17. An angle δ formed by the first tangent $z_1$ and the second tangent $z_2$ is such that 90°≤δ≤175°, preferably 110° ≤δ≤170°. In the shown embodiment, δ=136°. A corresponding angle may be defined also for the second grooves 13 (not shown).

For the first grooves 12, the angle δ may be defined as:

$$\delta = 2 \arccos \frac{\sqrt{2R_1 h_{1c} - h_{1c}^2}}{R_1}$$

wherein $h_{1c}$ is the depth of the concave profile and is equal to $h_1$ before polishing. After polishing, hic is smaller than $h_1$ as the height of the convexly rounded portion is not included.

Figure 7:
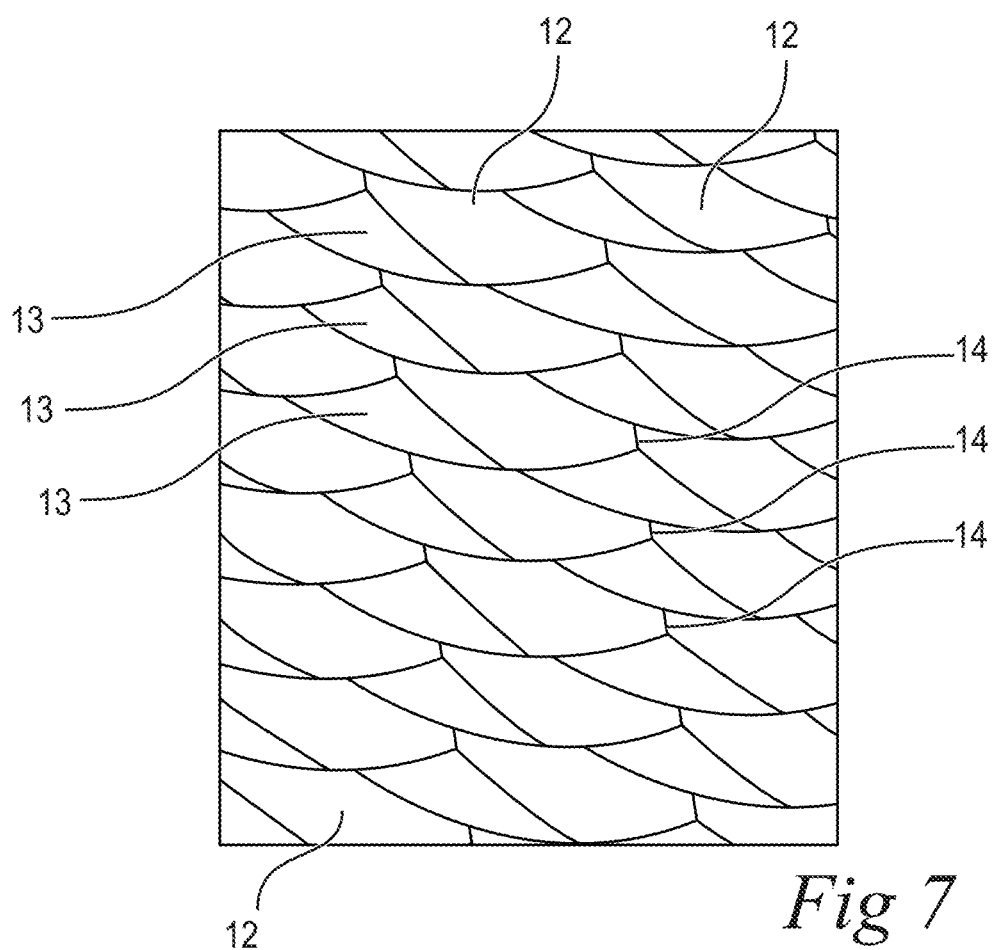
FIG. 7 is a scanned image of a wall surface of the tool body in FIG. 6.

A scanned image of a portion of the wall surface 9 of the tool body 2 shown in FIG. 6 is shown in FIG. 7.

The tool body 2 may be manufactured by means of a method comprising the following steps:
providing a tool body blank,
removing material from the tool body blank by a first tool to create a space forming the chip pocket 8,
machining the insert seat 6,
machining the first grooves 12, 12a-e in the wall surface 9 of the chip pocket 8 with a first ball-nose milling cutter,
machining the second grooves 13, 13a-e in the wall surface 9 of the chip pocket 8 with a second ball-nose milling cutter, such that the second grooves 13, 13a-e intersect the first grooves 12, 12a-e to create a surface pattern, the second ball-nose milling cutter being preferably the same milling cutter as the first ball-nose milling cutter,
preferably, but not necessarily, polishing and/or applying any other final treatment for deburring and/or rounding off sharp scallops between the grooves 12, 12a-e, 13, 13a-e.

The step of machining the insert seat 6 may be done either before or after the steps of machining the grooves.

During machining of a workpiece using the milling tool 1 shown in FIG. 1, chips are removed from the workpiece by a cutting edge of the cutting insert 7 and hit the front wall surface 10 of the chip pocket 8 during evacuation from the working area. Thanks to the surface pattern, the contact area between the chips and the front wall surface 10 is reduced. The friction arising when the chips travel upward along the front wall surface 10 is consequently also reduced and a smooth chip evacuation is achieved, minimising the risk of chip jamming.

The invention is of course not limited to the embodiments disclosed, but may be varied and modified within the scope of the following claims. For instance, the shape of the cutting inserts may be varied as well as the number of insert seats in the tool body. The surface pattern may be formed only on a part of the wall surface, such as only on the front wall surface or on a portion of the front wall surface.

The invention claimed is:

1. A tool body for a milling tool, the tool body comprising:
a front end and a rear end between which a centre axis and a peripheral envelope surface extend, the tool body being configured to be rotated in a direction of rotation around the centre axis;
at least one insert seat formed in a transition between the front end and the peripheral envelope surface, wherein the insert seat is configured to support a cutting insert arranged to be mounted therein;
a chip pocket provided in front of the insert seat in the direction of rotation, wherein the chip pocket is delimited by a wall surface; and
a surface pattern included in the wall surface of the chip pocket, the surface pattern including a plurality of first concavely curved grooves forming a ridge extending along at least two neighbouring first concavely curved grooves and a plurality of second concavely curved grooves formed at the ridge of the at least two first concavely curved grooves,
wherein each of the first concavely curved grooves extends along a first length extension direction and each of the plurality of second concavely curved grooves extends along a second length extension direction, different from the first length extension direction, such that the plurality of second concavely curved grooves intersect the plurality of first concavely curved grooves,
wherein each groove of the plurality of first concavely curved grooves and each groove of the plurality of second concavely curved grooves has a concave groove profile, and
wherein the concave groove profile is arc shaped.

2. The tool body according to claim 1, wherein, for each groove of the plurality of first concavely curved grooves and as seen in a sectional view orthogonal to the first length extension direction or for each groove of the plurality of second concavely curved grooves and as seen in a sectional view orthogonal to the second length extension direction, the concave groove profile extends between a first end point and a second end point, and
wherein a first tangent to the concave groove profile at the first end point and a second tangent to the concave groove profile at the second end point intersect below the concave groove profile, wherein an angle δ formed by the first tangent and the second tangent is such that 90°≤δ≤175°.

3. The tool body according to claim 1, wherein the plurality of first concavely curved grooves are arranged such that two neighbouring first concavely curved grooves are immediately adjacent to each other.

4. The tool body according to claim 1, wherein a radius of curvature or an approximated radius of curvature of the arc shaped concave groove profile is within the range of 1-6 mm.

5. The tool body according to claim 1, wherein a radius of curvature of the concave groove profile of the plurality of first concavely curved grooves is equal to a radius of curvature of the concave groove profile of the plurality of second concavely curved grooves.

6. The tool body according to claim 1, wherein the wall surface includes a front wall surface facing the insert seat, wherein the surface pattern is included in the front wall surface.

7. The tool body according to claim 1, wherein the surface pattern includes a plurality of protrusions formed between the plurality of first concavely curved grooves and plurality of second concavely curved grooves, each protrusion being delimited by two neighbouring first concavely curved grooves and two neighbouring second concavely curved grooves.

8. The tool body according to claim 7, wherein each protrusion is formed at the ridge.

9. The tool body according to claim 7, wherein each protrusion, as seen in a sectional view orthogonal to the first length extension direction or orthogonal to the second length extension direction, has a rounded top.

10. The tool body according to claim 1, wherein the plurality of first concavely curved grooves are spaced by a first distance of 0.5-3 mm and/or the plurality of second concavely curved grooves are spaced by a second distance of 0.5-3 mm.

11. The tool body according to claim 1, wherein, in the surface pattern, the plurality of first concavely curved grooves are parallel to each other and/or the plurality of second concavely curved grooves are parallel to each other.

12. The tool body according to claim 1, wherein a maximum depth of the plurality of first concavely curved grooves and/or the plurality of second concavely curved grooves is within the range of 0.03-0.20 mm.

13. A milling tool comprising:
a tool body according to claim 1; and
at least one cutting insert mounted in the at least one insert seat.

14. A method for manufacturing a tool body according to claim 1, the method comprising:
providing a tool body blank;
removing material from the tool body blank by a first tool to create a space forming the chip pocket;
machining the insert seat;
creating the plurality of first concavely curved grooves in the wall surface with a first ball-nose milling cutter;
creating the plurality of second concavely curved grooves in the wall surface with a second ball-nose milling cutter, such that the plurality of second concavely curved grooves intersect the plurality of first concavely curved grooves to create a surface pattern, the second ball-nose milling cutter being the same type of milling cutter as the first ball-nose milling cutter; and
optionally, polishing and/or applying any other final treatment for deburring and/or rounding off sharp scallops between the plurality of concavely curved first grooves and between the plurality of concavely curved second grooves.

15. The tool body according to claim 1, wherein the surface pattern is included in the wall surface of the chip pocket.

16. The tool body according to claim 1, wherein the surface pattern is included in a major part of the wall surface of the chip pocket.

17. The tool body according to claim 1, wherein the surface pattern is included in an entirety of the wall surface of the chip pocket.

18. The tool body according to claim 6, wherein the surface pattern is included in a major part of the front wall surface of the chip pocket.

19. The tool body according to claim 6, wherein the surface pattern is included in an entirety of the front wall surface of the chip pocket.

20. A tool body for a milling tool, the tool body comprising:
a front end and a rear end between which a centre axis and a peripheral envelope surface extend, the tool body being configured to be rotated in a direction of rotation around the centre axis;
at least one insert seat formed in a transition between the front end and the peripheral envelope surface, wherein the insert seat is configured to support a cutting insert arranged to be mounted therein;
a chip pocket provided in front of the insert seat in the direction of rotation, wherein the chip pocket is delimited by a wall surface; and
a surface pattern included in the wall surface of the chip pocket, the surface pattern including a plurality of first grooves and a plurality of second grooves,
wherein each of the plurality of first grooves extends in a first length extension direction, each of the plurality of second grooves extends in a second length extension direction, and the first length extension direction is different from the second length extension direction such that the plurality of second grooves intersect the plurality of first grooves,
wherein each groove of the plurality of first grooves and each groove of the plurality of second grooves has a concave groove profile that is arc shaped,
wherein the plurality of first grooves includes two neighbouring first grooves that are adjacent to each other and separated by a ridge, and
wherein two neighbouring second grooves of the plurality of second grooves are separated in the first length extension direction by a distance along the ridge such that the two neighbouring second grooves of the plurality of second grooves are connected by a portion of the ridge.

21. The tool body according to claim 20, wherein the portion of the ridge between the two neighbouring second grooves has a rounded top.

* * * * *